(12) United States Patent
Kozlowski (10) Patent No.: US 9,555,272 B2
(45) Date of Patent: Jan. 31, 2017

(54) REGULATORY COMPLIANT STANDPIPE HOSE VALVE AND CONNECTION

(71) Applicant: Oval Fire Products Corporation, Wheaton, IL (US)

(72) Inventor: Kevin M. Kozlowski, Wheaton, IL (US)

(73) Assignee: Oval Fire Products Corporation, Wheaton, IL (US)

( * ) Notice: Subject to any disclaimer, the term of this patent is extended or adjusted under 35 U.S.C. 154(b) by 0 days.

(21) Appl. No.: 14/717,462

(22) Filed: May 20, 2015

(65) Prior Publication Data

US 2016/0129290 A1 May 12, 2016

Related U.S. Application Data

(60) Provisional application No. 62/000,641, filed on May 20, 2014.

(51) Int. Cl.
| | |
|---|---|
| *A62C 35/68* | (2006.01) |
| *A62C 35/60* | (2006.01) |
| *A62C 35/20* | (2006.01) |
| *F16K 31/46* | (2006.01) |

(52) U.S. Cl.
CPC ............. *A62C 35/68* (2013.01); *F16K 31/46* (2013.01); *A62C 35/20* (2013.01); *A62C 35/60* (2013.01); *Y10T 137/87788* (2015.04)

(58) Field of Classification Search
CPC ......... A62C 35/20; A62C 35/58; A62C 35/60; A62C 35/68; Y10T 137/87788; Y10T 137/87796; Y10T 137/87804; Y10T 137/87812; Y10T 137/8782
USPC .................. 169/5, 16, 18; 137/872–876
See application file for complete search history.

(56) References Cited

U.S. PATENT DOCUMENTS

| | | | | |
|---|---|---|---|---|
| 14,252 | A * | 2/1856 | Pusey .................. | A62C 35/605 169/16 |
| 1,862,110 | A * | 6/1932 | Conran ................ | A62C 35/605 169/16 |
| 4,939,931 | A * | 7/1990 | Reeves .................. | E03B 7/072 73/198 |
| 5,036,883 | A * | 8/1991 | McHugh ................ | A62C 35/68 137/557 |

\* cited by examiner

*Primary Examiner* — Mary McManmon
*Assistant Examiner* — Richard K Durden
(74) *Attorney, Agent, or Firm* — Richards Patent Law P.C.

(57) ABSTRACT

A standpipe assembly including a pair of elongated, side-by-side chambers each including a first end and a second end, a Y-valve including an inlet and two outlets, each outlet in fluid communication with a respective one of the first ends of the pair of chambers, a hose connection snoot in fluid communication with the second ends of the pair of chambers, and a valve handle operatively connected to the Y-valve, wherein the valve handle is positionable between a first position and a second position, in the first position, the valve handle is spaced apart from the pair of chambers by at least two inches, in the second position, the valve handle is spaced apart from the pair of chambers by less than two inches.

6 Claims, 13 Drawing Sheets

REGULATORY COMPLIANT STANDPIPE HOSE VALVE AND CONNECTION

CROSS-REFERENCE TO RELATED APPLICATIONS

This application incorporates by reference and claims the benefit of priority to U.S. Provisional Patent Application No. 62/000,641 filed May 20, 2014.

BACKGROUND OF THE INVENTION

The present subject matter relates generally to a water valve and hose connection for fire protection standpipe hose systems. More specifically, the present invention relates to water valve and hose connection for fire protection standpipe hose systems that improves compliance with regulatory requirements by reducing the depth of the valve and connection assembly in compliance with the Americans with Disabilities Act (ADA) while remaining in compliance with standards and requirements for these types of valves and hose connections as established by various regulatory authorities.

Accessible building standards as described within, but not limited to, the United States Americans With Disabilities Act (ADA), ANSI A117.1, and ICC A117.1, limit the protrusion of any object to four inches, if the bottom leading edge of the object is located in a range greater than twenty-seven inches and below eighty inches from the finished floor. The protruding object rule's primary purpose is to protect those who are blind and low vision, and those who use a cane to detect protruding objects within a path of travel.

Presently, the NFPA design guidelines, while using the present technology, are not compliant with the protrusion limits as described within the ADA and other accessibility codes.

National Fire Protection Association 14, Standard for the Installation of Standpipes and Hose Systems, provides guidance on the placement and clearances required for standpipe hose connections. These dimensions are intended to make access to and use of the standpipe system easier for firefighters. According to NFPA 14:

Hose connections and hose stations should be unobstructed and located not less than 3 feet (0.9 meter) or more than 5 feet (1.5 m) above the floor measured from the floor to the center of the hose station valve. This provides easy access to the hose station so firefighters do not have to overly stretch or bend to attach the hose and operate the outlet.

Hose connections should be located so there is at least 3 inches (76.2 millimeters) of clearance between any adjacent object and the handle of the valve when the valve is in any position ranging from fully open to fully closed.

Using the current art and technology, NFPA 14 compliant standpipe hose connections violate the Accessible Building Standards, namely the four inch protrusion limit for objects located between twenty-seven and eighty inches above the finished floor. Also within the current art, a detectable barrier is sometimes, yet rarely, installed beneath standpipe hose connections.

Protrusion limit violations, created by standpipe hose connections, commonly occur in retail stores, stairwell landings of mid-rise and high-rise buildings, Areas of Rescue Assistance (mostly, but not always, stairwell landings), and hotel corridors.

Accordingly, there is a need for a standpipe valve system which allows both a standpipe valve and hose connection fitting to protrude less than four inches from the structural element to which the valve and/or hose connection fitting has been mounted to, as described herein.

BRIEF SUMMARY OF THE INVENTION

To meet the needs described above and others, the present disclosure provides a standpipe assembly which allows both a standpipe valve and hose connection fitting to protrude less than four inches from the surface of the wall, support, building column, or structural element to which the standpipe assembly has been mounted against or fastened to.

Presently, standpipe hose connection valves often exceed four inches when measured from the face of the handle to the back of the valve, therefore when installed they will always protrude greater than four inches from the wall, support, building column, or structural element to which they are mounted or embedded.

The present invention reduces the overall depth of the valve and hose connection fitting, as an assembly, to less than four inches while remaining in compliance with standards and requirements for these types of valves and hose connections as established by the National Fire Protection Association (NFPA), Underwriters Laboratories (UL), Factory Mutual (FM) and other regulatory authorities.

The present invention provides a new technology to allow full compliance with both the NFPA 14 Standards and Accessible Building Standards such as the ADA and ANSI A117.1, particularly in regards to the protrusion limit of 4 inches (100 mm). In addition to meeting the accessibility code requirements, it improves the art of architecture and interior design. Our design may be desired as more aesthetically pleasing than the current art, and ergonomically superior as well. The present invention reduces the hazard of impact and injury for people with satisfactory vision as well. Retailers, in particular, may find the invention helpful for reducing liability and injury claims cause by patrons walking into ordinary standpipe hose connections.

In an embodiment, the standpipe valve system may include a shallow profile pipe with an embedded self-retracting valve operator. The shallow profile pipe may be an aluminum pipe made by machine extrusion and may include embedded gear components of the valve operator. To permit sufficient water flow while maintaining a sufficiently shallow profile, the shallow profile pipe may include two or more internal cavities for water flow with diameters smaller than would be required for a single pipe cavity. A hose connection snoot may be provided at the base of the shallow profile pipe to permit the connection of water hoses. The shallow profile pipe may further include an embedded shaft to link the valve operator to the standpipe valve.

In an embodiment, the standpipe valve can be located directly above the assembly, with the valve stem directly aligned with, and connected to, the manually rotated drive shaft. The valve may lie flush with the shallow profile pipe to create an aesthetically pleasing installation. The valve stem of the standpipe valve may be offset from the axis of the manually rotated vertical drive shaft, and connected by gears, chain, belt, or other common method of linkage. Upon actuation of the valve operator, the valve stem may open the valve seal to permit water flow into the shallow profile pipe.

Another variation of the invention's design is to use a presently available valve, but to install said standard valve and associated pipe at a height of greater than eighty inches. The stem of the standard valve could be connected to the drive shaft by sprockets and chain, or other common linkages such as pulleys and belt. Although potentially less aesthetically pleasing than a valve lying flush with the shallow profile pipe, such an installation would have the benefit of utilizing existing valves.

In an embodiment, a standpipe assembly includes a pair of elongated, side-by-side chambers each including a first end and a second end; a Y-valve including an inlet and two outlets, each outlet in fluid communication with a respective one of the first ends of the pair of chambers; a hose connection snoot in fluid communication with the second ends of the pair of chambers; and a valve handle operatively connected to the Y-valve, wherein the valve handle is positionable between a first position and a second position, in the first position, the valve handle is spaced apart from the pair of chambers by at least two inches, in the second position, the valve handle is spaced apart from the pair of chambers by less than two inches.

In some embodiments, the standpipe assembly further includes a back face and a front face, wherein the front face includes a front of the chambers and the valve handle, wherein, when the back face is mounted to a surface, the front face extends out less than four inches from the surface.

In some embodiments, the Y-valve includes a valve stem O-ring, wherein the valve handle is manipulatable to move the Y-valve from a closed state to an open state, wherein, when the Y-valve is in the open state, the valve handle is manipulatable to further expose the valve stem O-ring.

In some embodiments, the standpipe assembly further includes a valve stem coupling, wherein the valve stem coupling transmits a rotational force to the valve stem from a shaft driven by the valve handle, wherein the valve stem coupling is connected to one of the valve stem or the shaft, wherein the valve stem coupling includes a passageway for receiving one of the shaft or the valve stem to permit the valve stem and the shaft to move relative to each. And, in some embodiments, each of the chambers includes a diameter of less than three and one half inches. Further, in some embodiments, the outlet is a rotatable outlet.

An advantage of the invention is that it provides a standpipe hose valve having full compliance with both the NFPA 14 Standards and Accessible Building Standards such as the ADA and ANSI A117.1, particularly in regards to the protrusion limit of 4 inches (100 mm).

Another advantage of the invention is that it provides a standpipe hose valve that is aesthetically pleasing than the current art, and ergonomically superior as well.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1A:
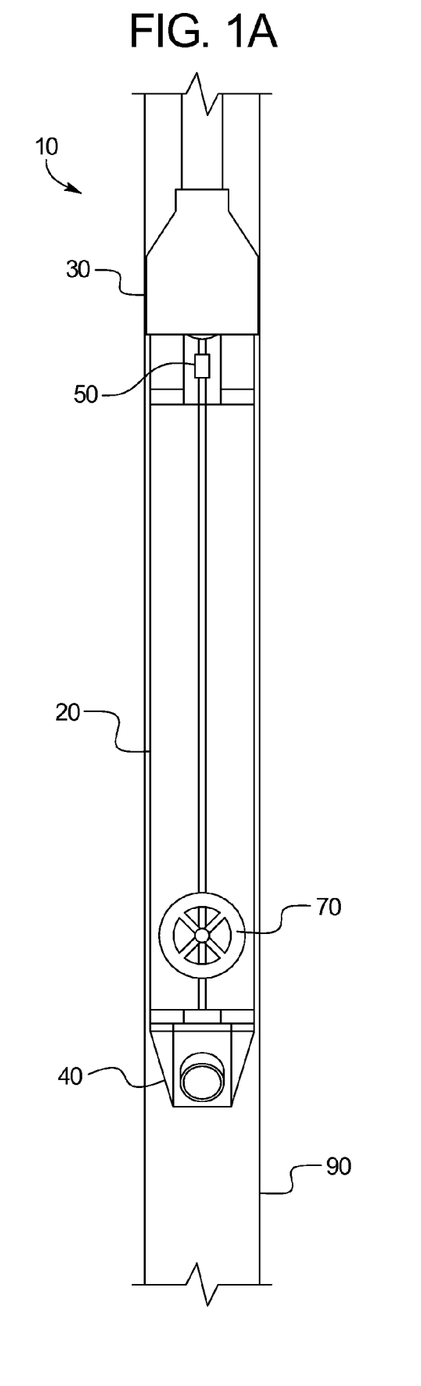
FIG. 1A is a front view of an example standpipe assembly with an aligned straight Y valve.
Figure 1B:
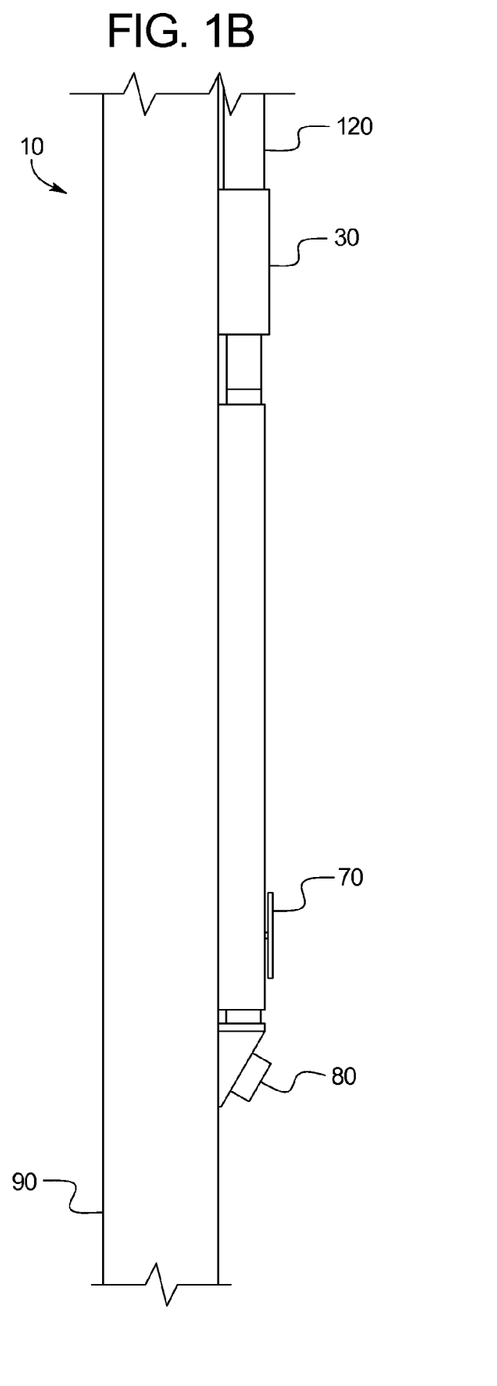
FIG. 1B is a side view of the example standpipe assembly of FIG. 1A.

FIGS. 1A and 1B illustrate an example of a standpipe assembly 10. As shown in FIG. 1, the standpipe assembly 10 includes a straight Y valve 30, a shallow profile pipe 20, and a snoot assembly 40. The shallow profile pipe 20 is mounted on a surface 90 of a column, wall, etc. The straight Y valve 30 connects the shallow profile pipe 20 to pressurized fire sprinkler piping 120. The shallow profile pipe 20 is connected, in turn, to a snoot assembly 40. In use, a firefighter connects a fire hose to a hose connection snoot 80 of the snoot assembly 40 and turns on the flow of water using valve handle 70. In an embodiment, the valve handle 70 is retractable to reduce the profile of the standpipe assembly 10.

As shown in FIG. 1B, the standpipe assembly 10 is configured to have a shallow profile. FIG. 2B is a side view that illustrates the depth 110 of the standpipe assembly 10. The depth 110 is the dimension perpendicular to the surface 90 on which the standpipe assembly 10 is mounted. (As used herein, surface 90 includes any mounting column, wall, support, or other surface on which the standpipe hose station is mounted.) In an embodiment, to comply with regulations, the depth 110 of the standpipe assembly 10 does not exceed four inches. In the embodiment shown in FIG. 2B, the depth 110 of the standpipe assembly 10 does not exceed three and eighty-five hundredths inches.

Figure 2A:
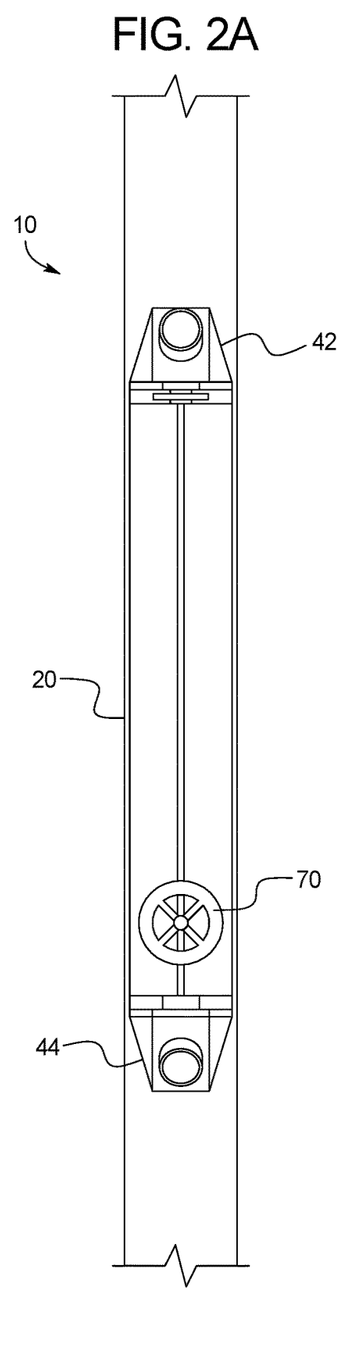
FIG. 2A is a front view of an example standpipe assembly with a chain driven angle valve.
Figure 2B:
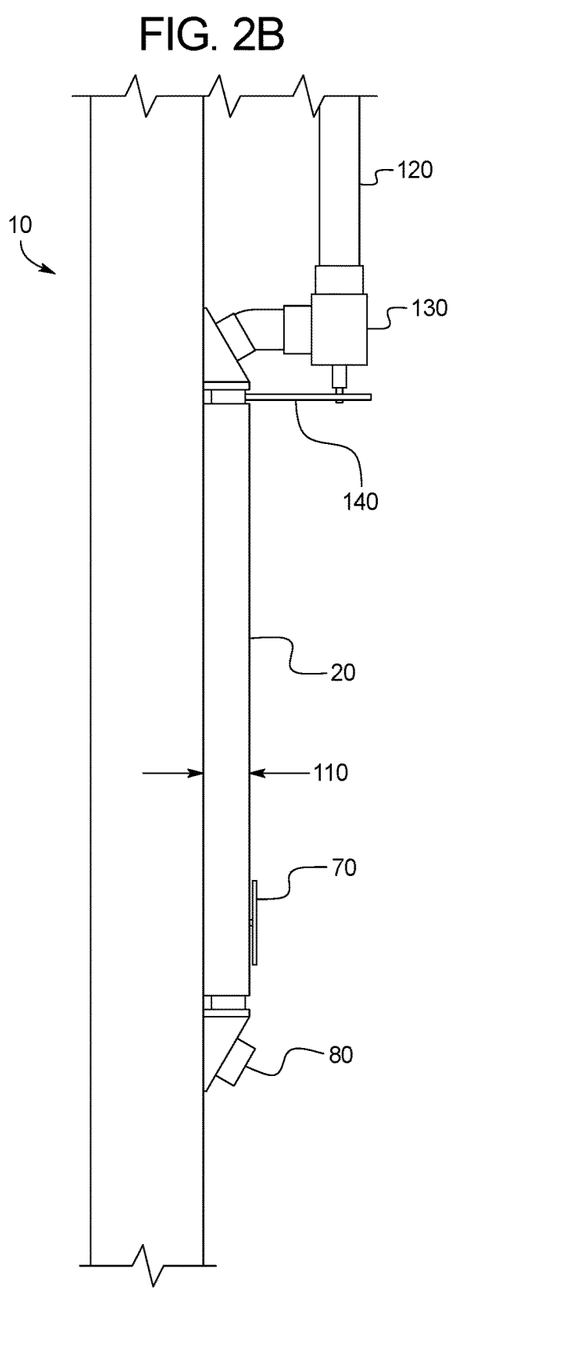
FIG. 2B is a side view of the example standpipe assembly of FIG. 2A.

FIGS. 2A and 2B illustrate another example of a standpipe assembly 10 including a chain driven angle valve. As shown in FIGS. 2A and 2B, in an embodiment, a standpipe assembly 10 includes a first Y fitting 42, a second Y fitting 44, and a shallow profile pipe 20. The first Y fitting 42 is connected to the fire sprinkler piping 120 by a two-and-a half-inch valve 130. The two-and-a half-inch valve 130 may be opened and closed by a sprocket and chain drive 140 connected to the valve handle 70. The second Y fitting 44 may be installed at the base of the shallow profile pipe 20 for attachment of a fire hose.

Figure 3:
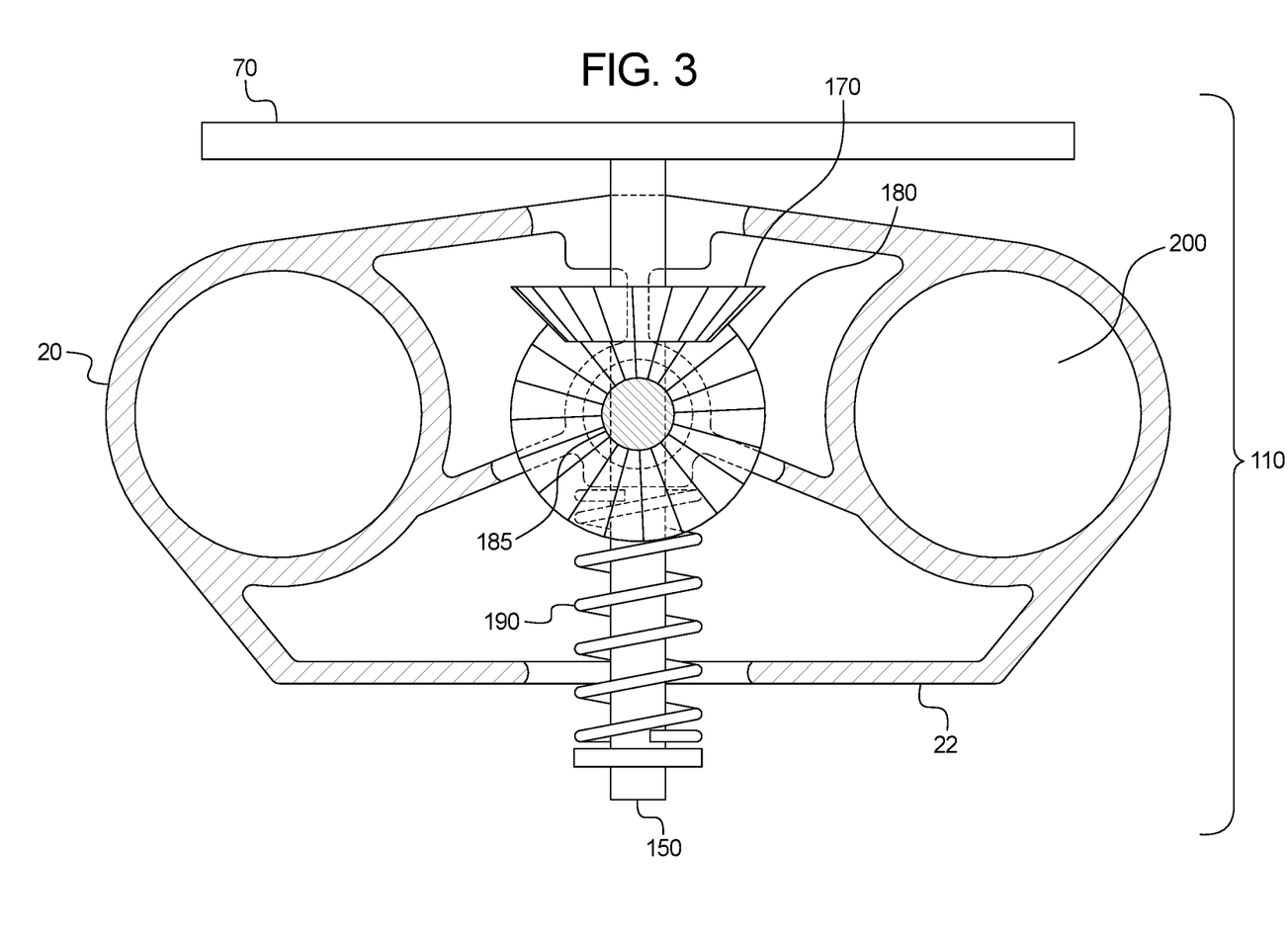
FIG. 3 is a cross-sectional top view of the shallow profile pipe of FIGS. 1A-2B.

FIG. 3 is a cross-sectional top view of the shallow profile pipe 20 of FIGS. 1A-2B illustrating the depth 110 of the shallow profile pipe 20 and the telescoping valve handle 70. The shallow profile pipe 20 provides a pipe for the flow of water that meets the protrusion limit of 4 inches by distributing the water over a plurality of pipe chambers 200. In an embodiment, the shallow profile pipe 20 includes two pipe chambers 200. The pipe chambers 200 may have a diameter sufficient to ensure the flow of water (at least of one and four-fifths inches in diameter in this embodiment). In other embodiments, additional pipe chambers 200 may be included to permit alternate profiles of the shallow profile pipe 20.

The valve handle 70 of the shallow profile pipe 20 may be connected to a telescoping shaft 150. To maintain a shallow profile when not in use, the valve handle 70 and the telescoping shaft 150 may be biased towards a retracted profile by a retraction spring 190. Rotational force on the valve handle 70 may be transmitted by the telescoping shaft 150 to a handle shaft gear 170. The telescoping shaft 150 may slide freely through the handle shaft gear 170 to permit extension and retraction of the valve handle 70. To ensure rotation of the handle shaft gear 170, the telescoping shaft 150 may also include a cross sectional area that engages the handle shaft gear 170 when rotated, such as, a D-shaped cross-section, a square-shaped shaft, a key way, etc. The handle shaft gear 170 may mesh with a vertical shaft gear 180 to drive a drive shaft 185. The drive shaft 185 may, in turn, drive the valve stem coupling 50 of FIGS. 1A and 1B, the sprocket and chain drive 140 of FIGS. 2A and 2B, etc.

Figure 4A:
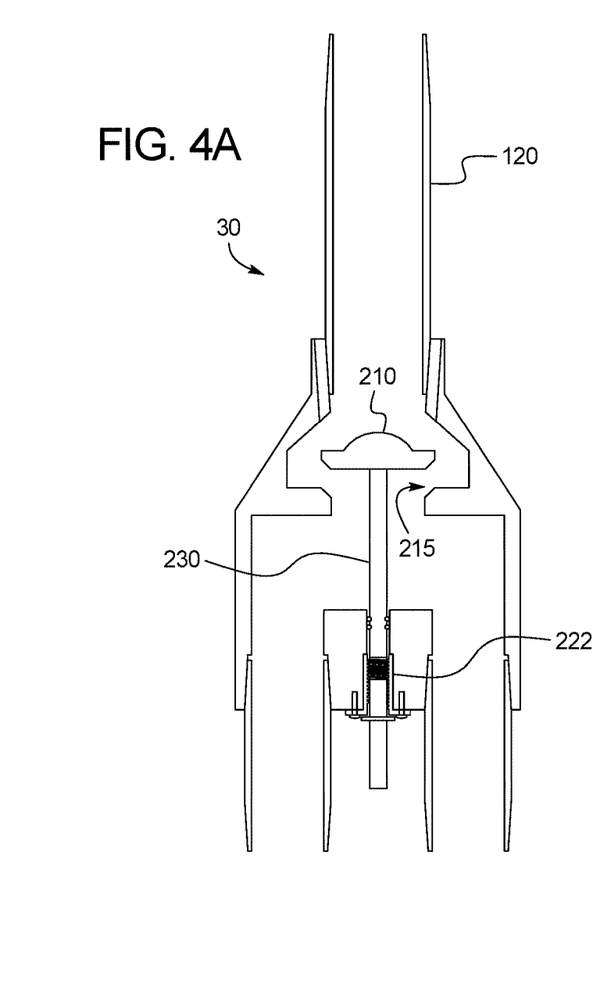
FIG. 4A is a cross-sectional front view of the straight Y valve of FIG. 1.
Figure 4B:
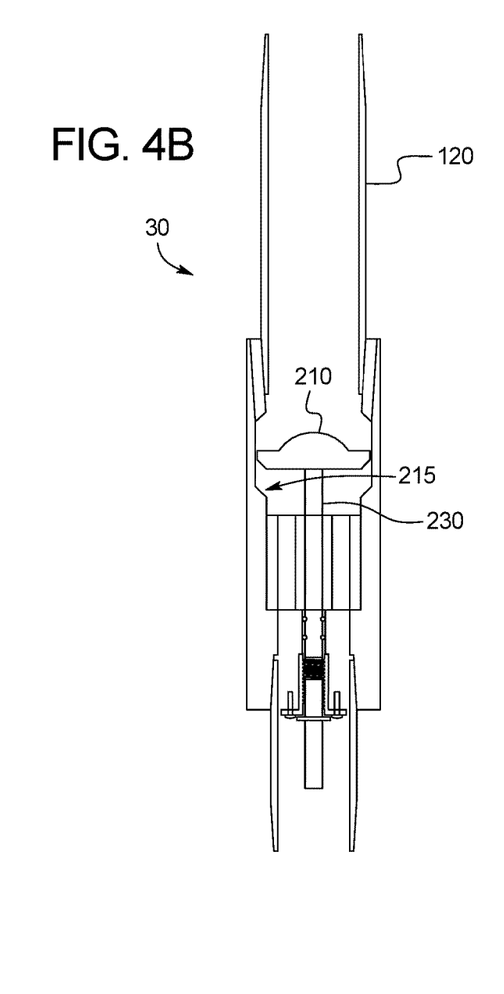
FIG. 4B is a cross-sectional side view of the straight Y valve of FIG. 1.

FIGS. 4A and 4B illustrate the straight Y valve 30 of FIGS. 1A and 1B. The straight Y valve 30 controls and distributes the flow of water from a single input fire sprinkler pipe 120 to the pipe chambers 200 of the shallow profile pipe 20. The straight Y valve 30 may include a valve seal 210 that, when in a closed position against the valve seat 215, restricts the flow of water. A valve stem 230 (FIG. 7A) may control the positioning of the valve seal 210. The valve stem 230 may be connected to the valve handle 70 via a valve stem coupling 50 to permit the user to open the valve seal 210 using the valve handle 70.

Figure 5A:
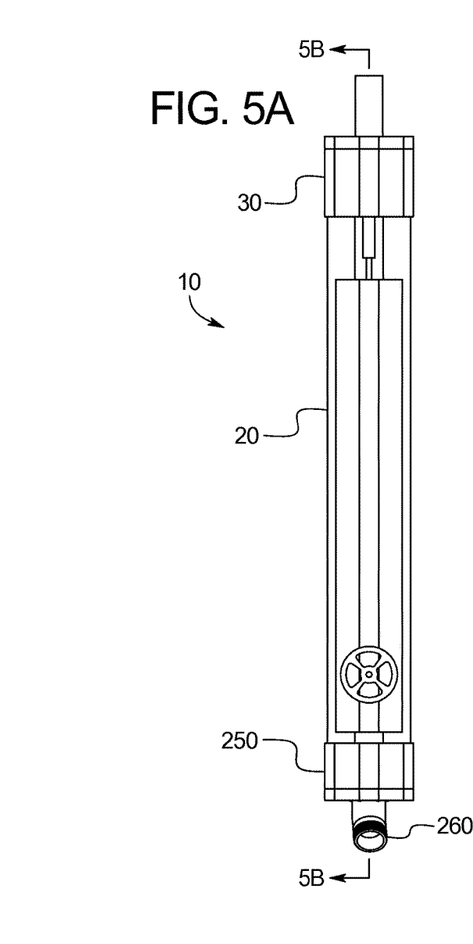
FIG. 5A illustrates a front view of the standpipe assembly.
Figures 5B, 5C:
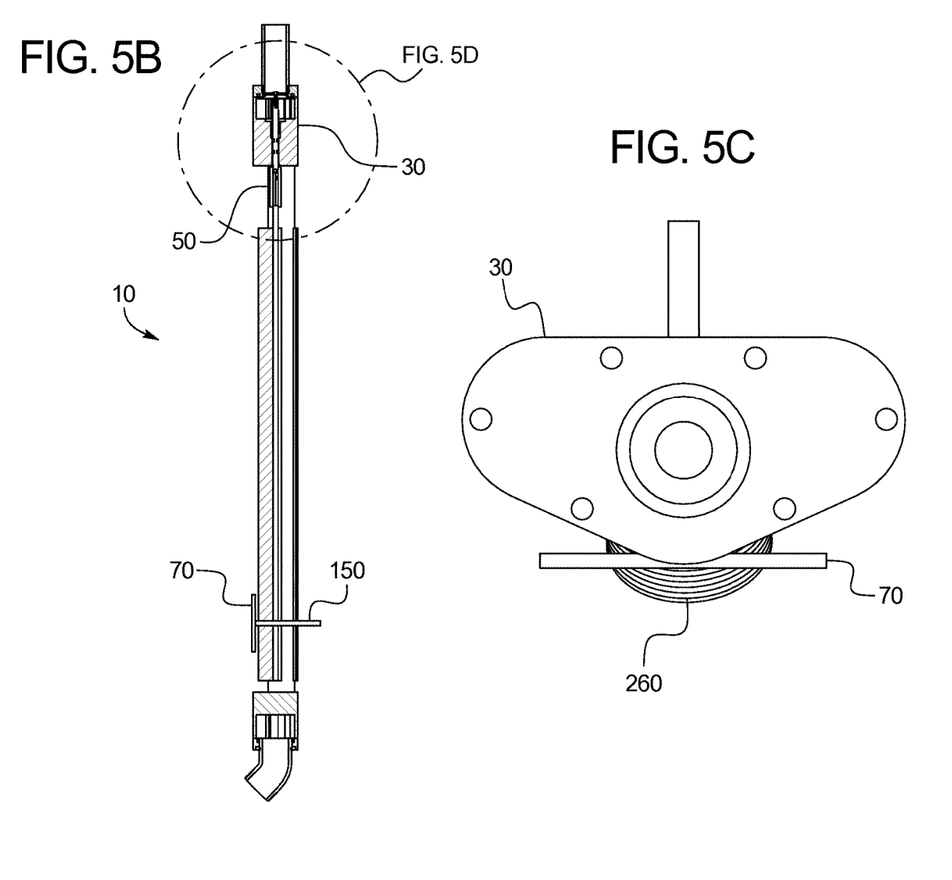
FIG. 5B illustrates a side view of the standpipe assembly.
FIG. 5C illustrates a top view of the standpipe assembly illustrating a top view of the straight Y valve.
Figure 5D:
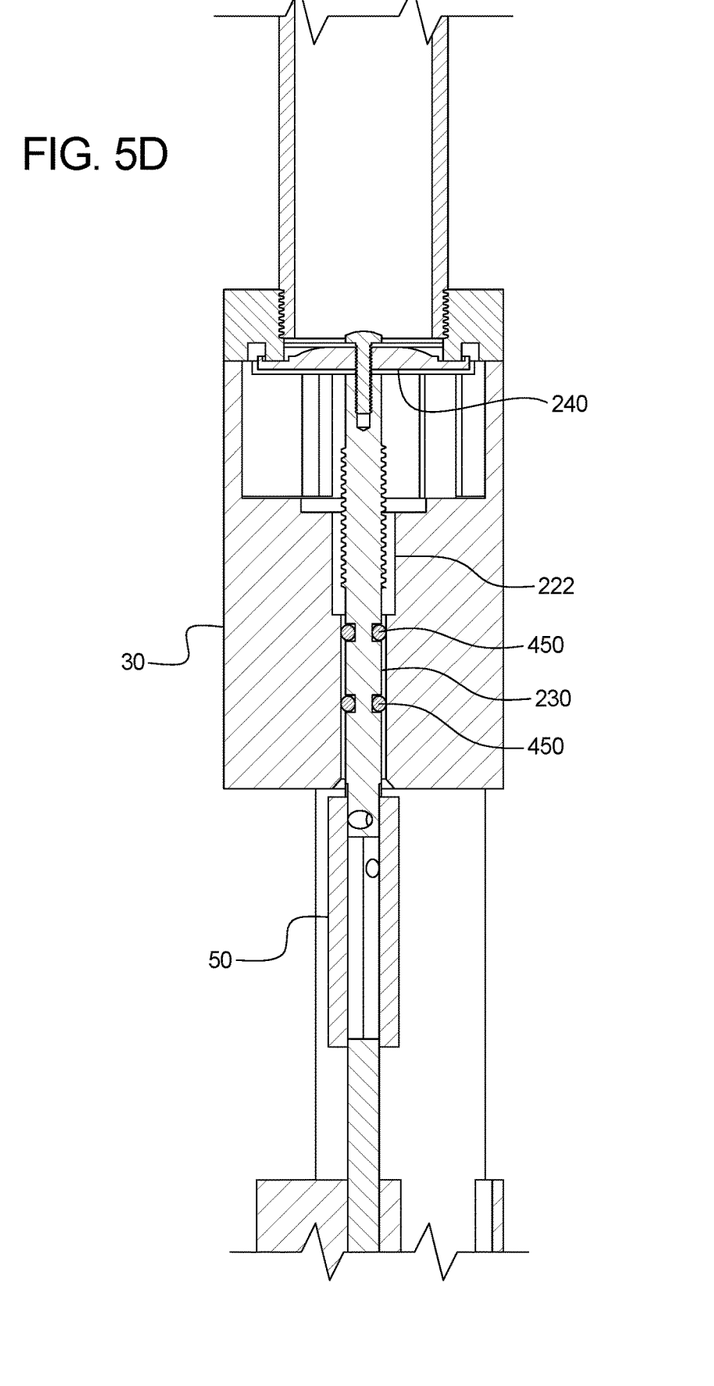
FIG. 5D illustrates a detailed cross-sectional side view of the straight Y valve.

FIGS. 5A-5D illustrate another example of a standpipe assembly 10 including a snoot assembly 40 including a rotatable snoot outlet 260. FIG. 5A illustrates a front view of the standpipe assembly 10 while FIG. 5B illustrates a side view of the standpipe assembly 10. FIGS. 5C and 5D illustrate a top view and cross-sectional view of the standpipe assembly 10, respectively. As shown, the telescoping shaft 150 may extend beyond the rear face 22 of the shallow profile pipe 20. Accordingly, the support surface 90 holding the standpipe assembly 10 may include an opening to permit the telescoping shaft 150 to retract into the closed position. A cap may be provided with the standpipe hose station to enclose the opening.

Figure 5E:
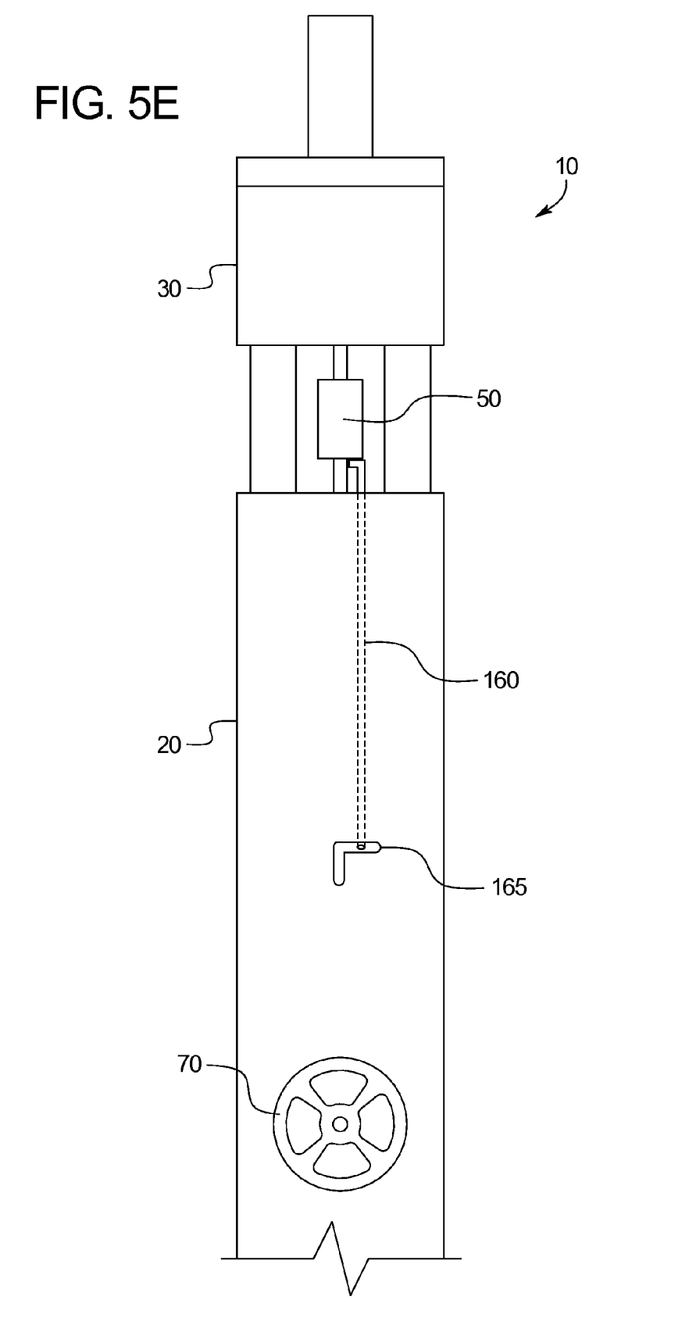
FIG. 5E illustrates a front view of the standpipe assembly including a pressure reducing valve rod.

FIG. 5E illustrates a front view of the standpipe assembly including a pressure reducing valve rod 160. The pressure reducing valve rod 160 permits the limiting of the pressure of the water in the manner of a pressure reducing/restricting valve. The pressure reducing valve rod 160 is a limiting device that limits water pressure by restricting the travel of the valve stem coupling 50 to limit the amount that the valve seal 215 may be opened. The pressure reducing valve rod 160 may sit within a hollow portion of the shallow profile pipe 20. The shallow profile pipe 20 may include an L-shaped slot 165 in which a tab portion of the pressure reducing valve rod 160 sits. A user may move the tab portion from one end of the L-shaped slot 165 to the other to move the pressure reducing valve rod 160 into a limiting position or a non-limiting position. The pressure reducing valve rod 160 may include a second tab at the opposite end from the tab portion to permit the pressure reducing valve rod 160 to fully engage the valve stem coupling 50 when in the limiting position.

Figure 6A:
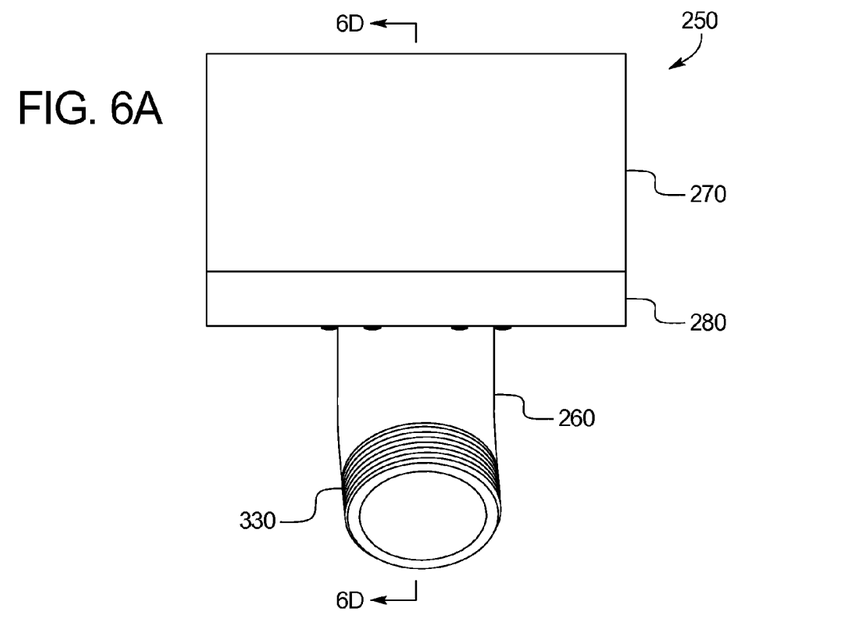
FIG. 6A illustrates a front view of an example snoot outlet assembly.
Figure 6B:
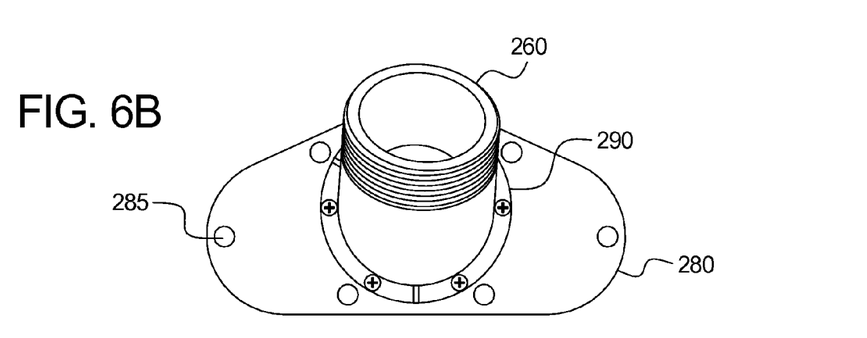
FIG. 6B illustrates a bottom view of the snoot outlet assembly.
Figure 6C:
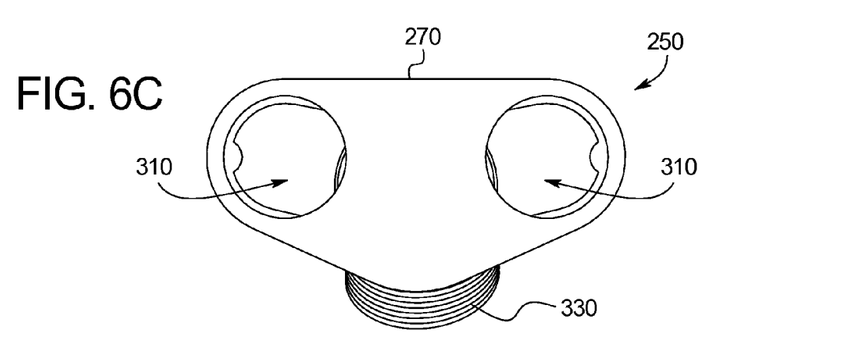
FIG. 6C illustrates a top view of the snoot outlet assembly.
Figure 6D:
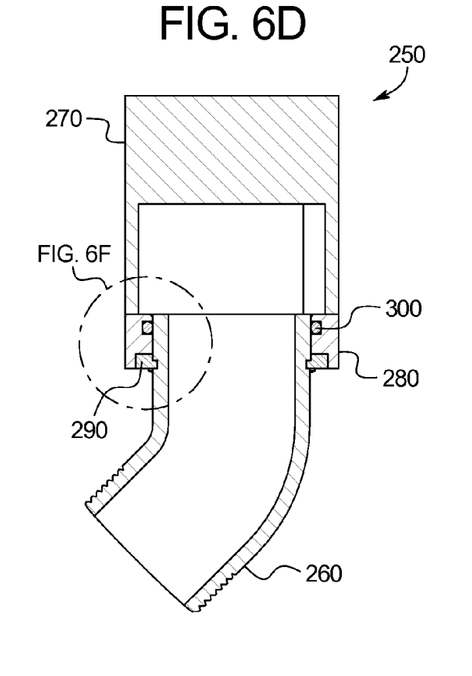
FIG. 6D illustrates a cross-sectional side view of the snoot outlet assembly.
Figure 6E:
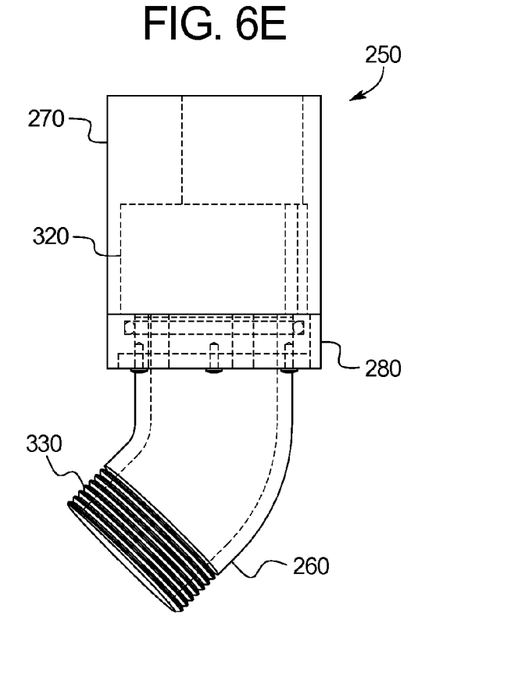
FIG. 6E illustrates a side view of the snoot outlet assembly illustrating the internal components in outline.
Figure 6F:
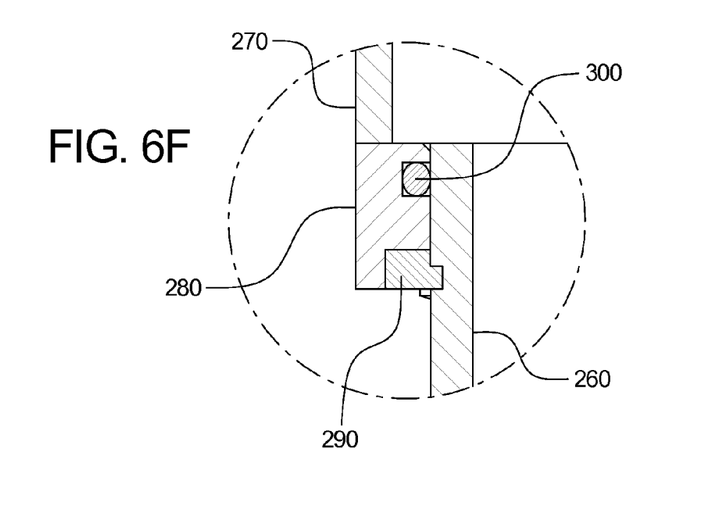
FIG. 6F illustrates the details of the snoot outlet assembly illustrating the connection between the snoot outlet with the remainder of the snoot outlet assembly.

FIGS. 6A-6C illustrate another example of the snoot assembly 40. The snoot assembly 40 includes a rotatable snoot outlet 260. One benefit of a rotatable snoot outlet 260 is that it may be rotated when it includes attachments in order to stay within the four-inch protrusion limit. For example, in some jurisdictions, fire departments may require that the snoot outlet include an installed reducer cap. Because the added reducer cap may protrude beyond the four-inch protrusion limit, the snoot outlet 260 may be rotated to move the reducer cap flush to the side.

The snoot assembly 40 may include a snoot outlet assembly upper body 270 and a snoot outlet assembly lower body 280. The snoot outlet assembly upper body 270 may be formed from a single piece of extruded aluminum including input chambers 310. A mixing chamber 320 may be drilled into the snoot outlet assembly upper body 270. The mixing chamber 320 combines the flow from the chambers 200 back into a single stream for output.

In an embodiment, the snoot outlet lower body 280 secures and directs the water flow into the snoot outlet 260. The snoot outlet lower body 280 may be attached to the snoot outlet assembly upper body 270 via retaining screws 285. The snoot outlet lower body 280, in turn, attaches the snoot outlet 260 to the snoot assembly 250. The snoot outlet 260 may be attached to the snoot outlet lower body 280 by a metal retainer split flange 290. A snoot O-ring 300 may seal the interface between the snoot outlet 260 and the snoot outlet. The snoot outlet 260 may also feature snoot external threading 330 for the attachment of hoses, piping, etc. to the snoot outlet 260.

Figure 7A:
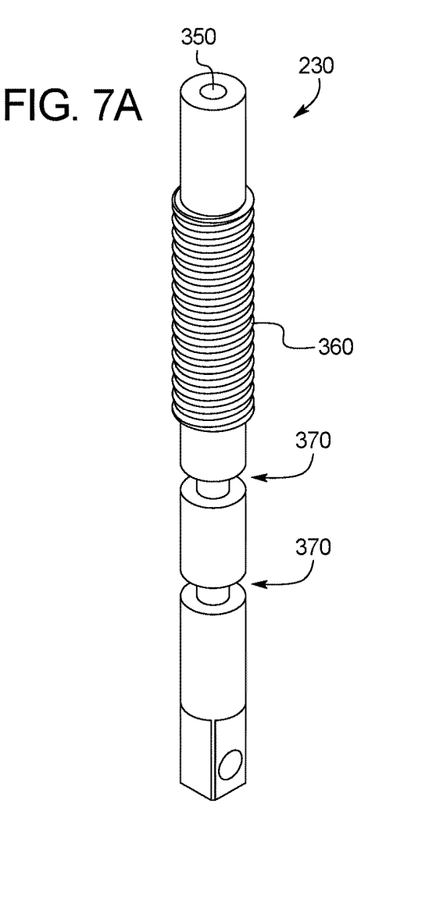
FIG. 7A illustrates a perspective view of a valve stem.
Figure 7B:
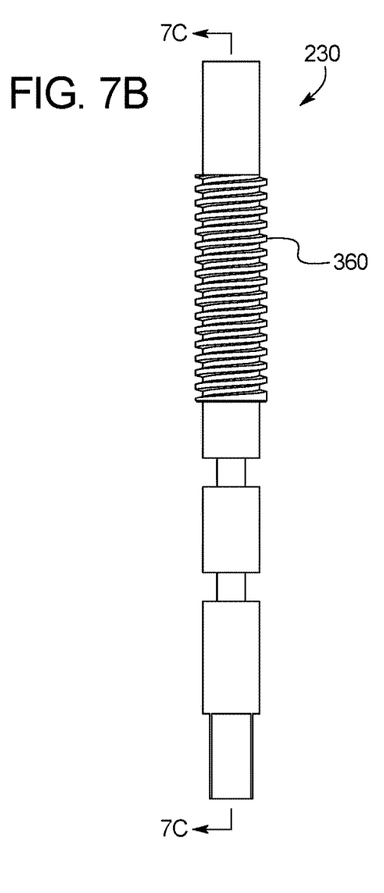
FIG. 7B illustrates a side view of the valve stem.
Figure 7C:
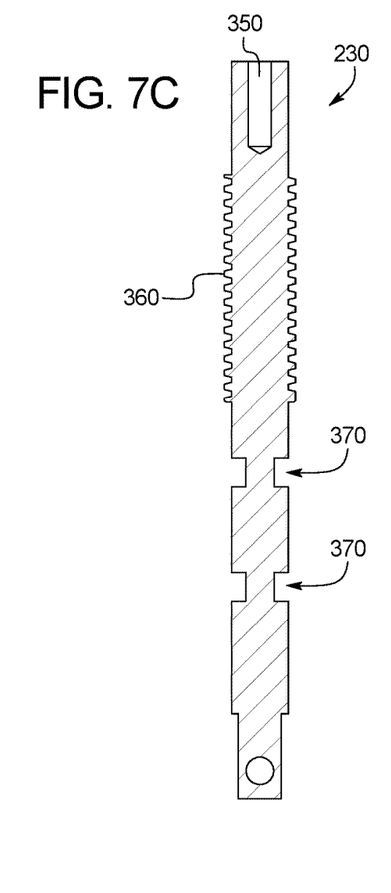
FIG. 7C illustrates a cross-sectional view of the valve stem.
Figure 8A:
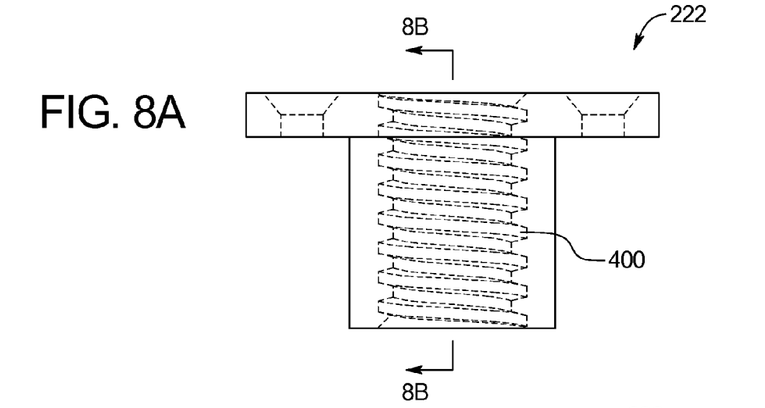
FIG. 8A illustrates a side view of a valve body insert of the straight Y valve.
Figure 8B:
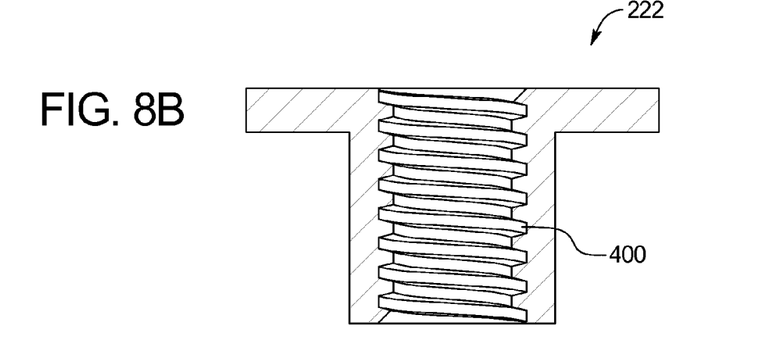
FIG. 8B illustrates a cross-sectional side view of the valve body insert of the straight Y valve.
Figure 8C:
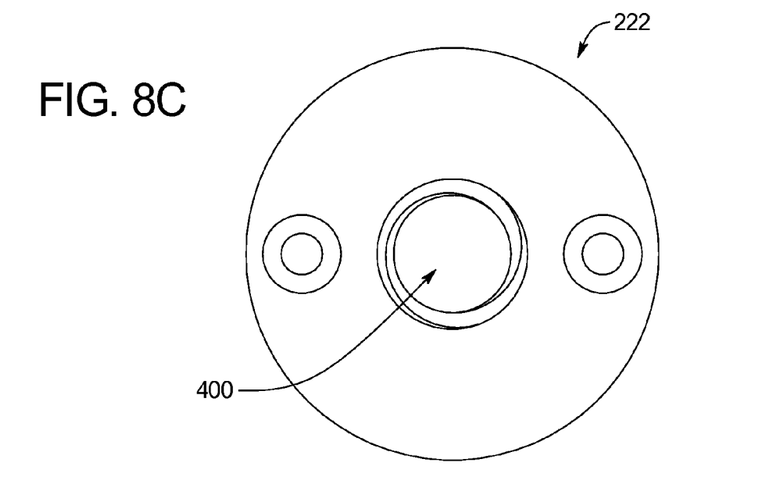
FIG. 8C illustrates a top view of the valve body insert of the straight Y valve.

FIGS. 7A-7C illustrate an example of the valve stem 230. Starting at the top, the valve stem 230 may include a threaded slot 350 for the attachment of the valve seal 240. Below the threaded slot 350, the valve stem 230 may include a threaded surface 360 that permits the valve stem 230 to be driven through the valve body insert 222 (FIGS. 8A-8C). And, below the threaded surface 360, the valve stem 230 may include one or more O-ring slots 370.

FIGS. 8A-8C illustrate a valve body insert 222 of the Y valve 30. The valve body insert 222 provides a threaded passageway 400 for the valve stem 230 that converts the rotational motion of the valve stem 230 into linear motion to permit the opening and closing of the valve seal 210. The valve body insert 222 is provided to permit the threaded passageway 400 to be separate from the Y valve 30 to permit ease of manufacture. It is contemplated that in some embodiments, the threaded passageway 400 may be manufactured as a part of the Y valve 30. The valve body insert 222 may include screw openings to permit the valve body insert 222 to be attached to the Y valve 30 using screws or other fasteners.

FIGS. 9A-9D illustrate the process of opening the Y valve 30 and changing a valve stem O-ring 450. Fire code regulations generally require that valve stem O-rings 450 be replaceable while the Y valve 30 is in an open position. Accordingly, in the embodiment shown, the straight Y valve 30 is adapted to permit the changing of the valve stem O-ring 450 while the valve seal 240 is in an open position.

Figure 9A:
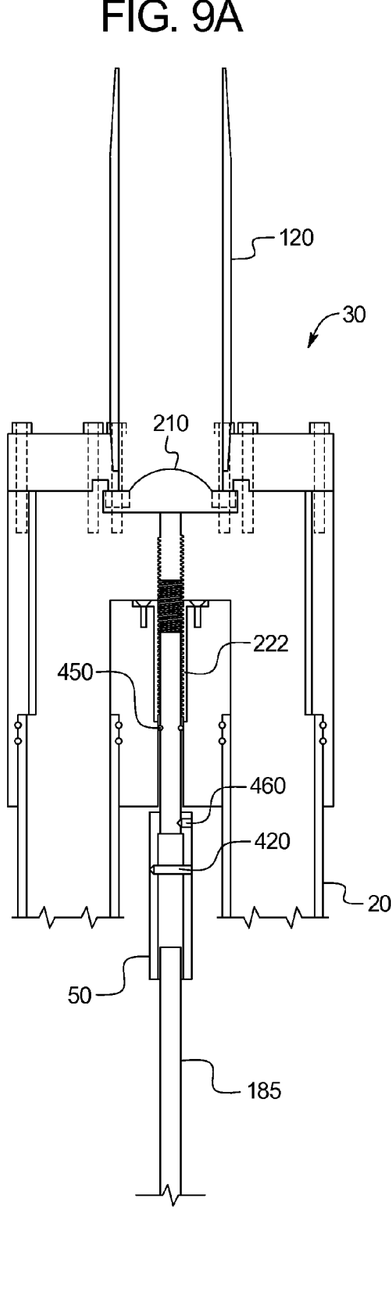
FIG. 9A illustrates an example of a straight Y valve with the valve in a closed position.
Figure 9B:
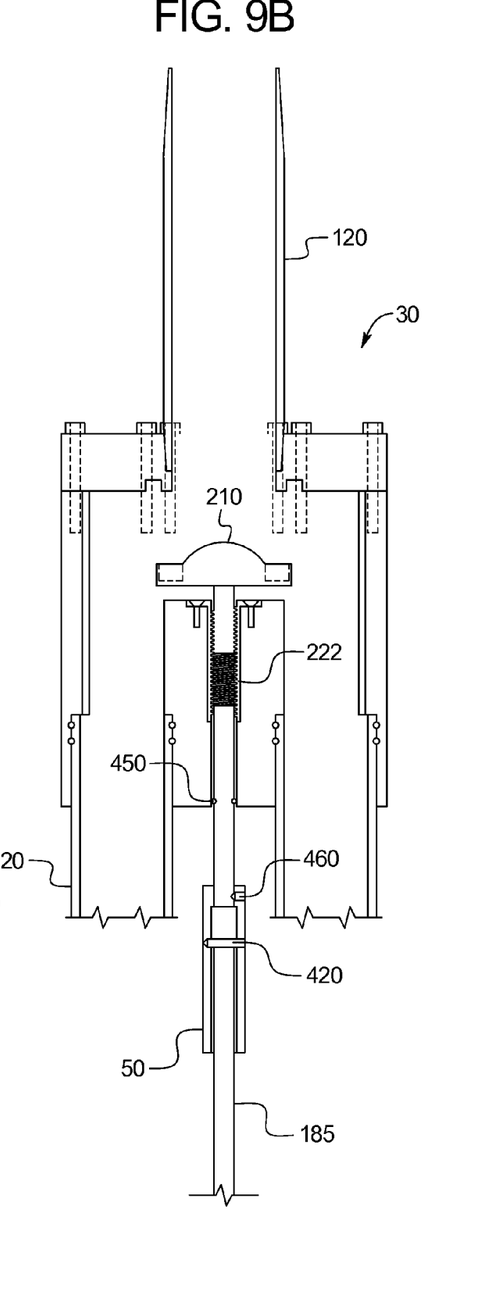
FIG. 9B illustrates the straight Y valve of FIG. 9A with the valve seal in an open position.
Figure 9C:
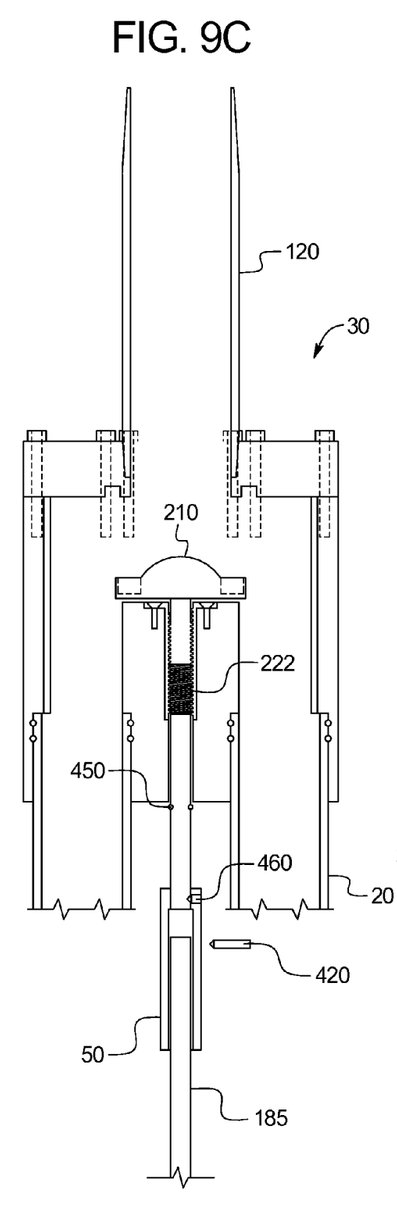
FIG. 9C illustrates the straight Y valve of FIG. 9B with the valve stem in an extended position to expose the valve stem O-ring.
Figure 9D:
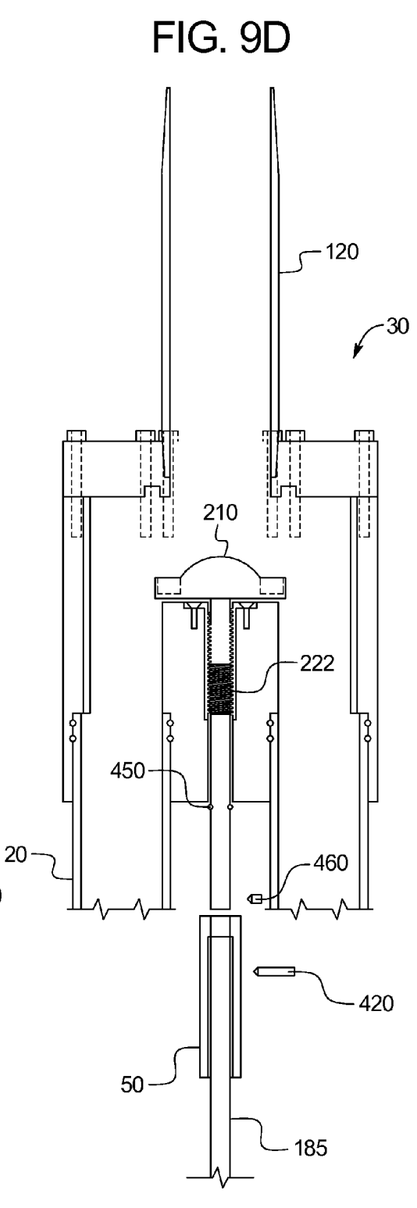
FIG. 9D illustrates the straight Y valve of FIG. 9C with the valve stem coupling detached from the valve stem to enable a service person to access and change the valve stem O-ring.

Before changing the valve stem O-ring 450, the valve seal 210 may be in a closed position, as shown in FIG. 9A. To begin the process, a serviceperson opens the valve seal 240 by turning the valve handle 70 until the valve seal 210 is in the open position as shown in FIG. 9B. Next, as shown in FIG. 9C, the serviceperson removes a limiting set screw 420. During normal operation, the limiting set screw 420 encounters the drive shaft 185 upon reaching a desired amount of linear travel to prevent damage to the valve stem 230 and unnecessary exposure of the valve stem O-ring 450. As shown in FIG. 9C, upon removal of the limiting set screw 420, the valve stem 230 may be extended further by further turning of the valve handle 70 to expose the valve stem O-ring 450. Then, as shown in FIG. 9D, the retaining screw 460 may be removed to disconnect the valve stem coupling 50 from the valve stem 230. The valve stem coupling 50 may then be moved to permit access to the valve stem O-ring 450 for replacement.

After replacement, the valve stem coupling 50 may be reattached with the retaining set screw 460. The valve handle 70 may then be turned in the closed direction until the new valve stem O-ring 450 is in place. Next, the limiting set screw 420 may be replaced to prevent over travel during normal use. And, finally, the valve seal 210 may be returned to the closed position.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A standpipe assembly comprising:
   a pair of elongated, side-by-side chambers each including a first end and a second end;
   a Y-valve including an inlet and two outlets, each outlet in fluid communication with a respective one of the first ends of the pair of chambers;
   a hose connection snoot in fluid communication with the second ends of the pair of chambers; and
   a valve handle operatively connected to the Y-valve, wherein the valve handle is positionable between a first position and a second position, in the first position, the valve handle is spaced apart from the pair of chambers by at least two inches, in the second position, the valve handle is spaced apart from the pair of chambers by less than two inches.

2. The standpipe assembly of claim 1, further including a back face and a front face, wherein the front face includes a front of the chambers and the valve handle, wherein, when the back face is mounted to a surface, the front face extends out less than four inches from the surface.

3. The standpipe assembly of claim 1, wherein the Y-valve includes a valve stem and a valve stem O-ring, wherein the valve handle is manipulatable to move the Y-valve from a closed state to an open state, wherein, when the Y-valve is in the open state, the valve handle is manipulatable to further expose the valve stem O-ring.

4. The standpipe assembly of claim 3, further including a valve stem coupling, wherein the valve stem coupling transmits a rotational force to the valve stem from a shaft driven by the valve handle, wherein the valve stem coupling is connected to one of the valve stem or the shaft, wherein the valve stem coupling includes a passageway for receiving one of the shaft or the valve stem to permit the valve stem and the shaft to move relative to each.

5. The standpipe assembly of claim 1, wherein each of the chambers includes a diameter of less than three and one half inches.

6. The standpipe assembly of claim 1, wherein the hose connection snoot includes a rotatable snoot outlet.

* * * * *